United States Patent
Gans et al.

(10) Patent No.: US 12,246,277 B2
(45) Date of Patent: Mar. 11, 2025

(54) SEALING ELEMENT

(71) Applicant: Bucher Unipektin AG, Niederweningen (CH)

(72) Inventors: Ulrich Gans, Kradolf (CH); Jürg Zuber, Uzwil (CH); Bettina Mayer, Rapperswil (CH); Thomas Duss, Altendorf (CH); Silvan Bruhin, Uznach (CH)

(73) Assignee: Bucher Unipektin AG, Niederwenigen (CH)

( * ) Notice: Subject to any disclaimer, the term of this patent is extended or adjusted under 35 U.S.C. 154(b) by 630 days.

(21) Appl. No.: 17/607,445

(22) PCT Filed: Apr. 24, 2020

(86) PCT No.: PCT/EP2020/061528
§ 371 (c)(1),
(2) Date: Oct. 29, 2021

(87) PCT Pub. No.: WO2020/221672
PCT Pub. Date: Nov. 5, 2020

(65) Prior Publication Data
US 2022/0203279 A1 Jun. 30, 2022

(30) Foreign Application Priority Data
Apr. 30, 2019 (EP) .................................. 19171716

(51) Int. Cl.
*B01D 39/20* (2006.01)
*B01D 63/06* (2006.01)

(52) U.S. Cl.
CPC ....... *B01D 39/2068* (2013.01); *B01D 63/066* (2013.01); *B01D 63/069* (2022.08);
(Continued)

(58) Field of Classification Search
None
See application file for complete search history.

(56) References Cited

U.S. PATENT DOCUMENTS 3,834,545 A * 9/1974 Del Pico .............. B01D 63/063
　　　　　　　　　　　　　　　　　　　210/321.89
4,640,774 A * 2/1987 Garcera ................ B29C 70/845
　　　　　　　　　　　　　　　　　　　210/450

(Continued)

FOREIGN PATENT DOCUMENTS

DE 198 46 041 A1 4/2000
DE 103 22 015 A1 12/2004
(Continued)

OTHER PUBLICATIONS

International Search Report Corresponding to PCT/EP2020/061528 mailed Aug. 12, 2020.
(Continued)

*Primary Examiner* — Bradley R Spies
*Assistant Examiner* — Jeannie McDermott
(74) *Attorney, Agent, or Firm* — Finch & Maloney PLLC

(57) ABSTRACT

A sealing element (5) for a filter element (2) in a housing body (1) of a filtration device, preferably in a cross-flow filtration device. The sealing element (5) is of one-piece annular design and comprises a section for the sealing arrangement of the filter element (2) in the housing body (1) and a section for stop damping the filter element (2).

10 Claims, 7 Drawing Sheets

(52) U.S. Cl.
CPC .. *B01D 2201/0453* (2013.01); *B01D 2201/34* (2013.01); *B01D 2313/041* (2022.08)

(56) References Cited

U.S. PATENT DOCUMENTS

| | | |
|---|---|---|
| 6,958,120 B2 | 10/2005 | Bläse et al. |
| 9,833,745 B2 | 12/2017 | Goebbert et al. |
| 2008/0197069 A1 | 8/2008 | Binkle et al. |
| 2015/0056903 A1* | 2/2015 | Nagano .................. F23J 13/04 122/18.31 |
| 2015/0136689 A1* | 5/2015 | Butters ................ B01D 63/066 277/626 |

FOREIGN PATENT DOCUMENTS

| | | |
|---|---|---|
| DE | 103 35 343 A1 | 3/2005 |
| DE | 10 2011 080 763 A1 | 2/2013 |

OTHER PUBLICATIONS

Written Opinion Corresponding to PCT/EP2020/061528 mailed Aug. 12, 2020.

* cited by examiner

SEALING ELEMENT

This application is a National Stage application of PCT/EP2020/061528 filed Apr. 24, 2020, which claims priority from European patent application serial no. 19171716.4 filed Apr. 30, 2019.

FIELD OF THE INVENTION

The present invention relates to a sealing element for, in particular, ceramic filter elements, and to filtration systems with perforated plates and such filter elements in combination with sealing elements according to the invention.

BACKGROUND OF THE INVENTION

Filter elements such as ceramic filter elements or filter elements made of plastic material are common devices for separating components from gases or liquids. A number of rod-shaped ceramic filter elements or plastic filter elements are arranged in parallel and also serially to each other in a housing body of a filtration device and are firmly clamped by means of perforated plates. The perforated plates have openings into which the rod-shaped ceramic filter elements or plastic filter elements are inserted. The diameter of such an opening is usually somewhat larger than the diameter of the end portion of the filter element to be inserted. In order to secure the filter element tightly in the opening even during the filtration process taking place under pressure and to seal the interior of the one housing body, an O-ring seal is provided which is arranged on one or more end regions of the filter element to act radially or axially, and which fills the intermediate space between the walls of the opening and the filter element.

Such O-ring sealing elements are known, for example, from DE 198 46 041 A1 and DE 103 22 015 A1.

This conventional sealing arrangement has several disadvantages. For example, the seals must be implemented with considerable force by clamping the O-ring sealing elements between two plates and pressing them into a sealing shape. This involves a risk of damaging or weakening the end sections of the filter elements.

This is another reason why, in the prior art, further stop dampers have to be provided to protect the ends of the ceramic filter elements or plastic filter elements, for example a second O-ring. This means additional effort and does not protect the ceramic ends or plastic ends securely enough.

SUMMARY OF THE INVENTION

It was the problem of the present invention to provide a sealing element for rod-shaped ceramic filter elements or plastic filter elements, which overcomes the above-described disadvantages from the prior art.

The foregoing problem has been solved by a sealing element according to the independent claim(s).

In particular, the present invention relates to a sealing element for a filter element in a housing body of a filtration device, preferably in a cross-flow filtration device, characterized in that the sealing element has a one-piece annular design and comprises a section for sealingly arranging the filter element in the filtration device and a section for stop damping the filter element.

In contrast to the prior art, the sealing element according to the invention combines both the sealing function of conventional O-ring seals and the stop-damping function of conventional stop dampers.

The sealing element according to the invention is of one-piece construction and is annular in shape. The diameter of the circular cut-out in the annular plane inside the sealing element is dimensioned such that the sealing element according to the invention can be pushed onto the end of conventional filter elements for use in cross-flow filtration systems, where it is in sealing contact with the filter element. Typically, the diameter of the circular cut-out inside the sealing element is in the range of 20 to 150 mm, preferably 20 to 80 mm, more preferably 40 to 65 mm and particularly preferably 40 to 55 mm.

According to the invention, the sealing element preferably has a thickness in the ring plane in the range of 2 to 8 mm, more preferably 3 to 6 mm.

The sealing element according to the present invention preferably has a height vertical to the ring plane in the range of 10 to 40 mm, more preferably 11 to 30 mm and particularly preferably 12 to 20 mm.

The sealing element is made of an elastic material, is of annular shape and deforms when the filter element is inserted into the corresponding opening of the perforated plate. This leads to the formation of a sealing connection between the sealing element and the filter element. In addition to meeting the required elastic properties, the elastic material must also be stable over a temperature range of at least 0° C. to 90° C., i.e. under both filtration conditions and sterilization conditions. Such materials are known to the skilled person. Highly elastic rubber materials such as EPDM (ethylene-propylene-diene rubber) are preferred, preferably with a Shore A hardness of 50 to 90, more preferably 60 to 80.

The sealing element according to the invention comprises a section for sealingly arranging a filter element in a perforated plate. This section is located at one end of the height extension of the sealing element, preferably in the lower half of the height extension of the sealing element. By height extension is meant here the extension of the sealing element vertical to its annular plane (i.e. its height). By lower half is meant here that part of the sealing element which, in the state in which the sealing element is arranged on a filter element, is located at the bottom, i.e. facing away from the corresponding end of the filter element.

In this section for sealingly arranging a filter element in a perforated plate, at least one integral O-ring-shaped part is arranged. However, more than one integral O-ring-shaped part, for example 1 to 5 O-ring-shaped parts, may be provided. According to the invention, preferably two integral O-ring-shaped parts are arranged in this section for sealingly arranging a filter element in a perforated plate.

According to the invention, the one or more O-ring-shaped parts in the sealing element according to the invention are preferably designed in such a way that they have protuberances in the annular plane of the sealing element, which protuberances extend away from the sealing element outwardly and/or inwardly into the circular cut-out of the sealing element. While the outwardly extending protuberances of the O-ring-shaped parts have the sealing function described above, the inwardly extending protuberances of the O-ring-shaped parts, in particular in combination with a corresponding ground joint on the filter element, can be used to achieve a non-slip positioning of the sealing element on the filter element and a sealing function between the sealing element and the filter element. According to a preferred embodiment of the invention, the one or more O-ring-shaped parts in the sealing element according to the invention are configured in such a way that they have protuberances in the annular plane of the sealing element, which protuberances extend away from the sealing element outwardly and inwardly into the circular cut-out of the sealing element.

According to a preferred embodiment of the invention, the thickness of the sealing element in the region of the O-ring shaped parts is extended by a value in the range of 3 to 7 mm, more preferably 4 to 6 mm and particularly preferably 4.5 to 5.5 mm. Where a plurality of integral O-ring shaped parts are provided in the corresponding section of the sealing element, they may either have the same thickness or different thicknesses, the different thicknesses being in the range indicated above. These values refer to the entire sealing element in a plane through the O-ring shaped part, vertical to the height of the sealing element.

According to a preferred embodiment of the invention, the sealing element has, in cross-section (i.e. not as above with respect to the entire sealing element), a ratio of a thickness in the region of the O-ring-shaped portions (denoted as $b2a/b2b$ in FIGS. 5 and 6) to a thickness in a region between the functional portions (denoted as $b1$ in FIG. 5) which is in the range of 1.3:1 to 4:1, preferably 1.5:1 to 3.5:1.

If an O-ring-shaped part has protuberances which extend away from the sealing element outwardly and inwardly into the circular cut-out of the sealing element, these protuberances may protrude from the thickness of the sealing element by the same value or differ from one another in this respect by a value in the range from 0.01 to 0.5 mm, preferably 0.05 to 0.3 mm.

The sealing element according to the invention further comprises an integral stop damping section. The stop damping section is located at the end of the sealing element remote from the sealing arrangement section, preferably in the upper half of the height extension of the sealing element. By upper half is meant here that part of the sealing element which is located at the top in the state in which the sealing element is arranged on a filter element, i.e. at the corresponding end of the filter element and protecting it.

The stop damping section of the sealing element may be configured to be provided in an L-shape at the corresponding end of the sealing element. The longer part of the stop damping section is located in the height extension area of the sealing element, while the shorter part of the stop damping section projects into the area of the circular cut-out inside the sealing element.

In other words, in this embodiment of the present invention, there is a cylindrical portion between the sealing arrangement portion and an end of the sealing element extending into the interior of the sealing element. Thus, when the sealing element is placed on the end of a filter element, the stop damping section of the sealing element surrounds the corresponding end of the filter element and protects it from damage.

In the region of the shorter part of the L-shaped section for stop damping, the thickness of the sealing element in cross-section (designated as $b2c$ in FIGS. 5 and 6) is extended into the interior of the sealing element preferably by 2 to 10 mm, more preferably by 3 to 6 mm.

According to a preferred embodiment of the invention, the sealing element has in cross-section a ratio of a thickness in the region of the shorter part of the L-shaped section for stop damping (denoted as $b2c$ in FIGS. 5 and 6) to a thickness in a region between the functional sections (denoted as $b1$ in FIG. 5) which is in the range of 1.25:1 to 6:1, preferably 1.6:1 to 4:1.

The shorter part of the L-shaped section for stop damping preferably has a height (denoted as $h2$ in FIGS. 5 and 6) of from 1 to 5 mm, more preferably from 2 to 4 mm.

According to a preferred embodiment of the invention, the sealing element has a ratio of a height vertical to the annular plane (denoted $h1$ in FIGS. 5 and 6) to a height of the shorter part of the L-shaped section for stop damping (denoted $h2$ in FIGS. 5 and 6), which is in the range of 2:1 to 40:1, preferably 2.5:1 to 20:1, more preferably 3:1 to 10:1.

According to a particularly preferred embodiment of the present invention, the section of the sealing element for stop damping may be beveled on its outer side, i.e. the corresponding end of the sealing element on the side facing away from the inner circular cut-out. This facilitates the insertion of a filter element provided with the sealing element according to the invention into a perforated plate of a filtering device. Preferably, the bevel is formed over a height of the sealing element of 0.5 to 4 mm, more preferably 1 to 3 mm, and with an angle relative to the height of the sealing element of preferably 10° to 45°, more preferably 15° to 40°.

In other words, in this preferred embodiment, a front end of the sealing element merges with a cylindrical portion of the sealing element via an inclined outer surface.

According to a further particularly preferred embodiment of the present invention, the section of the sealing element for stop damping may have on its outer side, i.e. the corresponding end of the sealing element on the side facing away from the inner circular cut-out, a protuberance analogous to the protuberances of the O-ring-shaped sections. Preferably the protuberance is formed over a height of the sealing element (denoted h2 in FIG. 6) of 0.5 to 4 mm, more preferably 2 to 3.5 mm, and outwardly extends in cross-section away from the sealing element by a value of 0.5 to 3 mm, preferably 1 to 2.5 mm and particularly preferably 1.2 to 2 mm.

The rod-shaped ceramic filter elements to be preferably used according to the present invention are known per se and need not be explained in detail here. According to the present invention, filter elements are preferred which are operated according to the cross-flow principle. According to this principle, the non-filtrate (i.e. non-filtered liquid) flows through channel-shaped bores in the filter element, while the filtrate flows transversely to the direction of flow of the non-filtrate through the porous material of the filter element into the interior of the filtration device and is discharged from there.

Common ceramic filter elements have diameters of 20 to 65 mm, for example 25 mm, 42 mm or 52 mm, and comprise one or more channel-shaped bores. The ceramic filter elements comprise, for example, a base body and a membrane (filtering layer). The pore size of the base body is in a range of, for example, 5 to 50 µm, preferably 10 to 30 µm, particularly preferably 20 µm. The membrane (filtering layer) on the inner walls of the channels comprises one or more layers and has a thickness of 0.5 to 10 µm. The pore size of the membrane ranges from 0.01 to 1.4 µm, depending on the application. Preferably, the filter elements are operated at a flow rate of 1-5 m/s, preferably 3-5 m/s.

According to a particularly preferred embodiment of the present invention, the filter elements are provided at one or both ends with a ground joint which can accommodate protrusions directed into the interior of the sealing element in the sealing arrangement section of the sealing element.

Preferably, the ground joint has a height axially to the rod axis of the filter element in the range of 5 to 20 mm, more preferably 5 to 15 mm, and most preferably 6 to 10 mm.

Further preferably, the ground joint has a depth in the range of 0.1 to 7 mm, more preferably 1 to 6 mm and most preferably 2.5 to 5 mm. The depth of the ground joint may vary along the circumference, since the diameter of the unground filter element is not constant. In other words, the radius of the filter element is reduced by the aforementioned value during grinding.

According to the present invention, rod-shaped non-ceramic filter elements may also be used. Preferably, these are plastic filter elements, i.e. filter elements which are made of a synthetic polymer material. The plastic material can be any synthetic polymer material that provides the material properties required for the intended use. For example, the synthetic filter element may consist of membrane tubes made of polyethersulfone and a grid envelope (grid tube) made of polypropylene.

According to the present invention, filter elements are preferred which are operated according to the cross-flow principle. Here, the non-filtrate (i.e. nonfiltered liquid) flows through the membrane tubes of the filter element, while the filtrate flows transversely to the direction of flow of the non-filtrate through the porous material of the filter element into the interior of the filtration device and is discharged from there.

The plastic filter elements which can be used according to the invention have diameters of 20 to 150 mm, for example 25 mm, 42 mm, 52, 60 or 150 mm, and comprise one or more membrane tubes, for example 1 to 300, preferably 10 to 280 membrane tubes. These membrane tubes, made for example of polyethersulfone, are joined together at their two ends by a potting compound, known as potting, to form a bundle. A grid tube made for example of polypropylene and enclosing this membrane bundle is also enclosed by the potting. This creates a mechanically stable cylinder, which is completed to a filter cartridge by attaching corresponding end pieces. The end pieces are manufactured in such a way that they can receive the sealing elements according to the invention.

The membrane tubes are manufactured in such a way that the wall has an internal structure which is suitable for separating turbid matter sufficiently well, on the one hand, and allows the highest possible filtrate flow, on the other hand. The pore size of this wall (=the membrane) is in a range of, for example, 10 to 1000 nm, preferably 100 to 600 nm.

Preferably, the filter elements are operated at a flow rate of 0.5-5 m/s, preferably 1-4 m/s.

According to a particularly preferred embodiment of the present invention, the plastic filter elements are provided at one or both ends with a ground joint end piece which can accommodate protuberances directed into the interior of the sealing element in the sealing arrangement section of the sealing element. The term "ground joint" is used for this embodiment, even though in the case of a plastic filter element the corresponding section can be produced by other means than grinding.

Preferably, the ground joint has a height axially to the rod axis of the filter element in the range of 5 to 20 mm, more preferably 5 to 15 mm and most preferably 6 to 10 mm.

Further preferably, the ground joint has a depth in the range of 0.1 to 7 mm, more preferably 1 to 6 mm and most preferably 1.5 to 5 mm. In other words, the radius of the filter element is reduced by the aforementioned value during grinding.

According to a preferred embodiment, the plastic filter element according to the invention comprises at least one end piece, preferably two end pieces. The end piece is connected to a membrane tube or membrane bundle, for example by a layer of cured epoxy resin. Preferably, both ends of the membrane tube or membrane bundle are each connected to an end piece as described above, these end pieces particularly preferably having the same dimensions.

The at least one end piece of the plastic filter element according to the invention is preferably shaped, at least over a section, in such a way that its diameter varies over its height. Preferably, this can be realized in that the at least one end piece of the plastic filter element according to the invention is conically shaped at least over a section. Preferably, the end piece has a larger diameter at the end connected to a membrane tube or membrane bundle than at the end to be arranged in a perforated plate, which end is preferably provided with a ground joint. For example, the diameter at the ends of the end piece may vary from each other by 5 to 20 mm, preferably 7 to 15 mmm. According to a preferred embodiment of the present invention, the end piece has a diameter at the end connected to the membrane tube or membrane bundle in the range of 20 to 150 mm, preferably 20 to 80 mm, more preferably 40 to 65 mm and particularly preferably 40 to 55 mm.

The at least one end piece of the plastic filter element according to the invention preferably has a height of from 50 to 150 mm, preferably from 70 to 100 mm.

The membrane tube or membrane bundle of the plastic filter element according to the invention preferably has a height of from 700 to 1500 mm, more preferably from 800 to 1200 mm. A membrane tube further preferably has an inner diameter of from 0.5 to 3 mm, more preferably from 1 to 2.5 mm. The membrane tube or membrane bundle further preferably has an outer diameter in the range of 20 to 150 mm, preferably 20 to 80 mm, more preferably 40 to 65 mm and particularly preferably 40 to 55 mm.

If a filter element has a ground joint described above at both ends, these ground joints may have the same dimension or may vary from each other in the ranges mentioned above.

The rod-shaped ceramic filter elements or plastic filter elements are arranged in parallel to one another in a housing body of a filtration device in a known manner. Preferably, and depending on the diameter of the filter elements, there are about 6 to 130 filter elements in such a housing body, although, depending on the size of the device, designs with 1 to 200 filter elements, and in the case of plastic filter elements up to 300 filter elements, are also used. For example, in a housing body of a filtration device having a diameter of 450 mm, 52 filter elements are arranged in the housing body when the diameter of the filter element is 42 mm, and 36 filter elements are arranged in the housing body when the diameter of the filter element is 52 mm. A filtration device may include one or more housing bodies.

According to a preferred embodiment of the present invention, the filter elements have beveled edges on the side intended for insertion into a perforated plate, preferably beveled edges of 30 to 60°, more preferably of 40-50°.

The ceramic filter elements or the plastic filter elements are clamped between two perforated plates, which act as the top plate and bottom plate of the housing body of the filtration device. The perforated plates close off the interior of the housing body of the filtration device at the top and bottom.

The perforated plates are known per se. They have a number of openings corresponding to the number of ceramic filter elements or plastic filter elements located in the housing body of the filtration device. According to a preferred embodiment, as explained above, the diameters of these openings are smaller than the diameters of the ceramic filter elements to be inserted into the openings, together with the sealing elements applied, by a small amount, so that a filter element together with the sealing element applied can be pushed into the corresponding opening, with deformation of the sealing element, and arranged there in a sealing manner. Preferably, the diameters of the openings lie in a range between the thickness of the sealing element according to the invention and the thickness of the sealing element increased by protuberances in the sealing section of the sealing element, so that the sealing section of the sealing element is slightly compressed by the introduction of the filter element together with the applied sealing element into the corresponding opening.

The filter element together with the applied sealing element can be easily inserted into the opening of the perforated plate and removed from it just as easily. Thus, a simple exchange of this component is ensured. Although the filter element is sealed with the aid of the sealing element according to the invention, it is not so firmly connected to the latter that removal of the filter element from the opening of the perforated plate would require a considerable amount of force. Rather, according to the invention, the filter element can be inserted into and removed from the opening very easily and without any particular force. A risk of damage to the filter element is thus minimized. At the same time, the filter element is securely positioned in the opening of the perforated plate and protected from damage by pressure excursions due to the good stop-damping of the sealing element according to the invention.

Due to the design of the sealing element according to the invention, it is not necessary to clamp the sealing element between two perforated plates for the sealing arrangement. The filter element together with the applied sealing element can be easily inserted into an opening of a perforated plate and fixedly arranged there. Thus, according to the invention, the number of perforated plates to be provided in a housing body can be reduced by half (2 instead of 4 perforated plates). Moreover, according to the invention, the perforated plates to be used can be thinner than in conventional devices, preferably by 5 to 30%, more preferably by 10 to 20% thinner than conventionally used perforated plates.

Furthermore, all components can be easily cleaned due to the simple dismantling and accessibility.

Filtration devices for separating substances from liquids or gases are known per se. The filtration device according to the invention is characterized by the innovative sealing element described above. Preferably according to the invention, the filtration device is a cross-flow filtration device. Cross-flow filtration devices are also known per se.

The filtration apparatus according to the invention is particularly suitable for the filtration of alcoholic and non-alcoholic beverages, especially preferably beer or fruit juices or fruit wines.

With the aid of the present invention it is also possible to convert existing filtration devices in a simple manner. For this purpose, conventional sealing-elements (O-ring seals and stop dampers) are replaced by the sealing element according to the invention, and preferably the number of perforated plates is reduced by half and, particularly preferably, the thinner perforated plates described above are used. According to a preferred embodiment, the conventional filter elements used in the existing filtration device can also be replaced by ground joint filter elements preferred according to the invention and described above.

BRIEF DESCRIPTION OF THE DRAWINGS

The present invention is explained in more detail below with reference to non-limiting drawings.

DETAILED DESCRIPTION OF THE PREFERRED EMBODIMENTS

Figure 1:
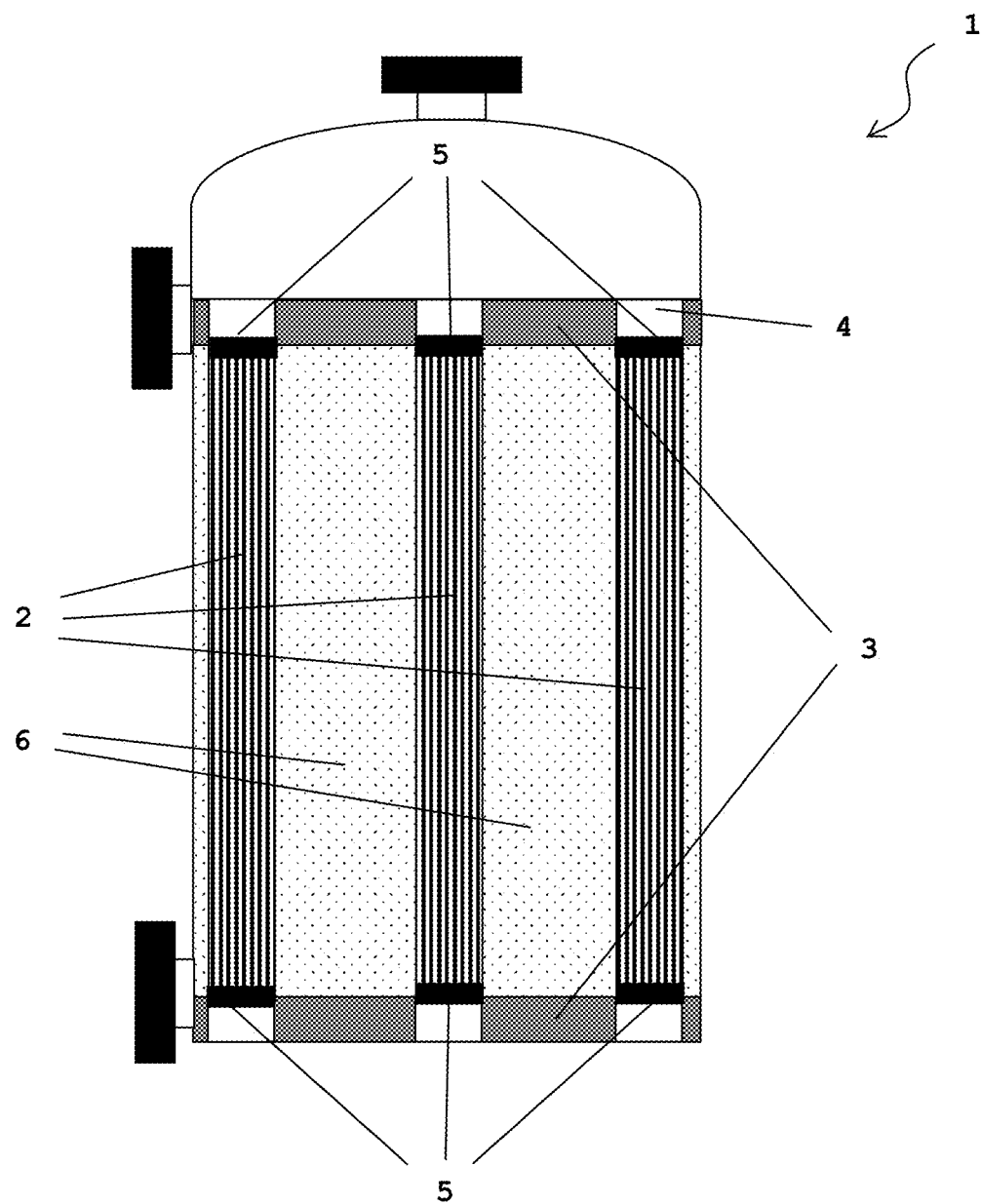
FIG. 1 shows a schematic cross-sectional view of an embodiment of a housing body of a filtration device according to the invention
Figure 2:
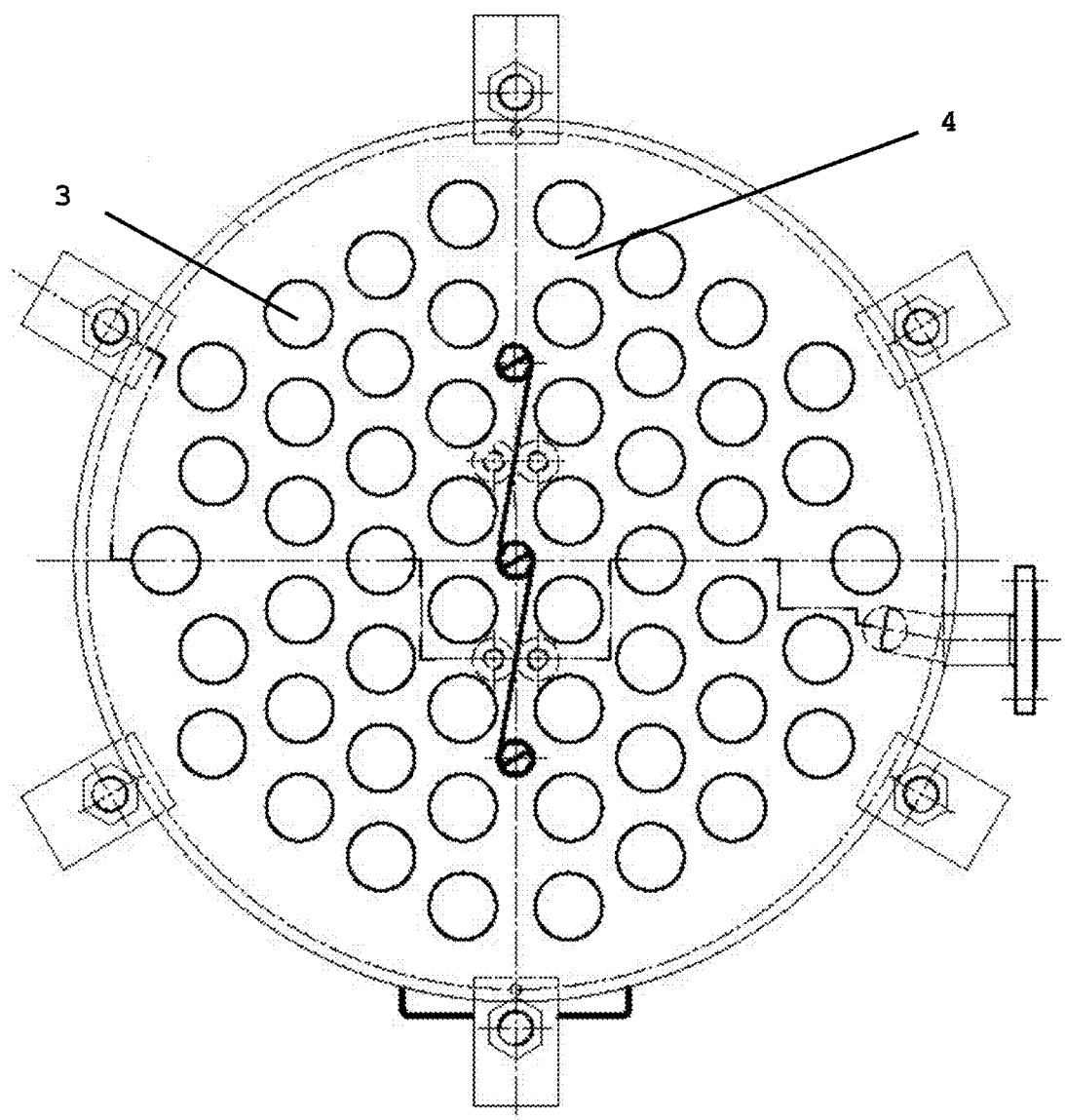
FIG. 2 shows a top view of an embodiment of a perforated plate according to the invention

FIG. 1 shows a schematic cross-sectional view of an embodiment of a housing body 1 of a filtration device according to the invention. A plurality of rod-shaped ceramic filter elements or plastic filter elements 2 with channel-shaped bores (for simplicity, only 3 elements are shown here; in reality, the housing body 6 comprises up to 130 such filter elements) are clamped between two perforated plates 3. As shown in FIG. 2, these perforated plates 3 comprise a number of openings 4 corresponding to the number of filter elements 2 present. The filter-elements 2 are inserted and securely arranged in these openings 4 together with the sealing elements 5 applied. The non-filtrate flows through the channels of the filter elements 2 and is filtered by flowing the filtrate transversely to the direction of flow of the non-filtrate through the porous material of the filter element 2 into the inner space 6 of the housing body 1 of the filtration device. The filtrate emerges from the outer periphery of the filter elements 2 and is collected in the inner space 6 of the housing body 1 of the filtration device and is conveyed out from there.

Figure 3:
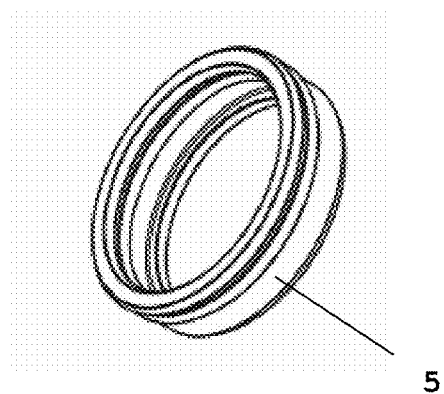
FIG. 3 shows a three-dimensional view of an embodiment of the sealing element according to the invention

FIG. 3 shows a three-dimensional view of an embodiment of the sealing element 5 according to the invention. The sealing element 5 is annular with a circular cut-out in the center. In the upper half of the sealing element 5, O-ring-shaped parts for sealing can be seen, which will be explained in more detail below in FIG. 5. In the lower half of the sealing element 5, the integral stop damping section can be seen, which is also explained in more detail below in FIG. 5.

Figure 4:
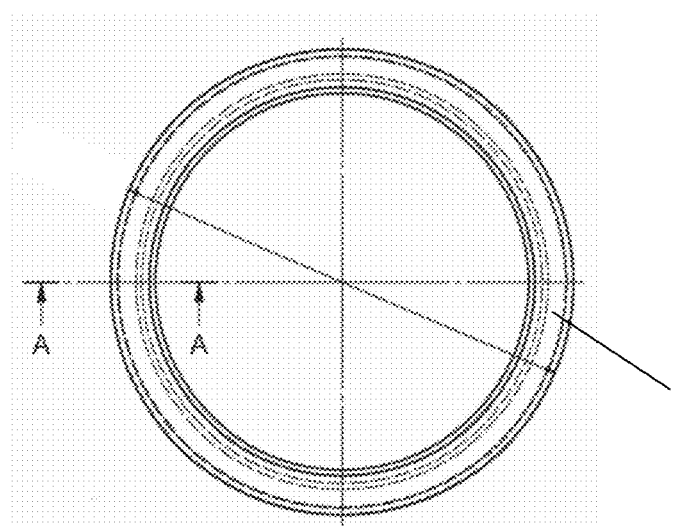
FIG. 4 shows a top view of an embodiment of the sealing element according to the invention

FIG. 4 shows a top view of an embodiment of the sealing element 5 according to the invention. The sealing element 5 is annular with a circular cut-out in the center, which has a diameter in the range from 20 to 80 mm, preferably 40 to 65 mm and particularly preferably 40 to 55 m.

Figure 5:
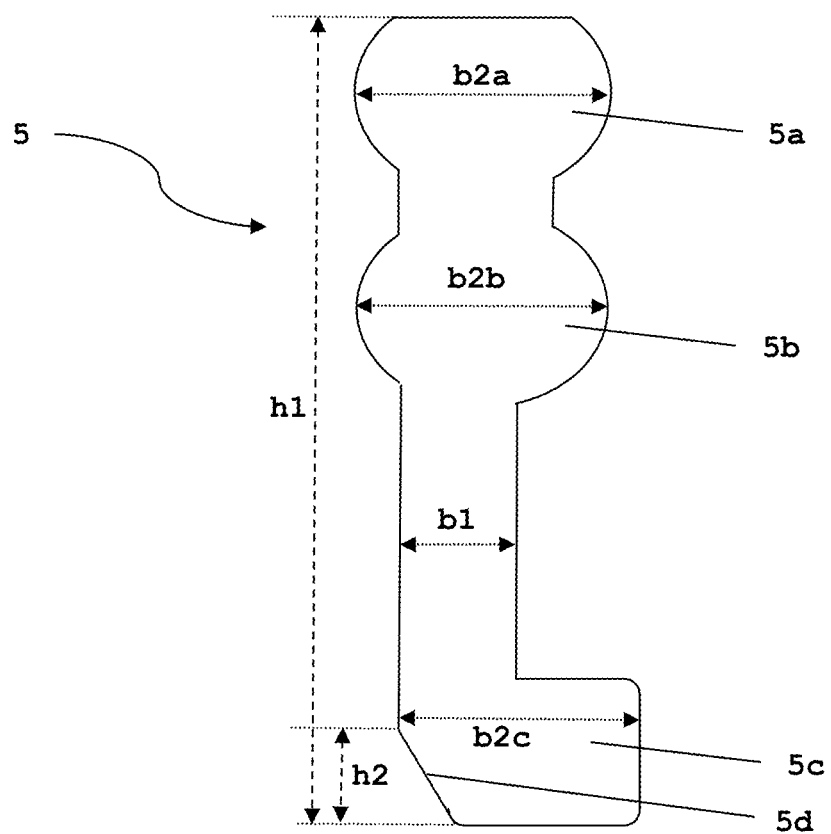
FIG. 5 shows a sectional view of an embodiment of the sealing element according to the invention through axis A-A in FIG. 4

FIG. 5 shows a sectional view through axis A-A in FIG. 4 of an embodiment of the sealing element according to the invention.

The sealing element 5 has a height h1 which is in the range of 10 to 40 mm, more preferably 11 to 30 mm and particularly preferably 12 to 20 mm. In cross-section, the sealing element 5 has a thickness b1 parallel to the plane of the ring, which is preferably in the range from 2 to 8 mm, more preferably 2.2 to 6 mm and particularly preferably 3 to 6 mm.

In one half (shown here at the top, but located at the bottom in the state arranged on a filter element 2), two integral O-ring-shaped parts 5a, 5b are provided. These O-ring-shaped parts 5a, 5b are configured as protuberances and, due to their outwardly extending protuberances, serve for the sealing arrangement of a filter element 2 provided with this sealing element 5 in an opening 3 of a perforated plate 4, while the inwardly extending protuberances serve for the non-slip arrangement of the sealing element 5 on a filter element 2 and for sealing between the filter element and the sealing element. The O-ring-shaped parts 5a, 5b have thicknesses b2a and b2b parallel to the ring plane, which are each larger than the thickness b1 of the sealing element 5. The thicknesses b2a and b2b may be the same or different from each other. According to a preferred embodiment of the invention, in cross-section the thicknesses b2a and b2b are expanded relative to the thickness b1 of the sealing element 5 by a value in the range from 2 to 7 mm, more preferably 2.2 to 6 mm and particularly preferably 2.5 to 5.5 mm.

At one end of the sealing element 5 (shown here at the bottom, but located at the top in the state arranged on a filter element 2), the sealing element 5 has an L-shape and has an integral section 5c. The section 5c serves as a stop damper by projecting over an edge of a filter element 2 in the arranged state and protecting the same.

In the region of the section 5c, the sealing element 5 has a thickness b2c which is preferably extended into the interior of the sealing element 5 by 2 to 10 mm, more preferably by 3 to 6 mm, as compared to the thickness b1 of the sealing element 5.

In the embodiment according to FIG. 5, the sealing element 5 has a bevel 5d in this section on its outer side, i.e. the corresponding end of the sealing element on the side facing away from the inner circular cut-out. The bevel 5d facilitates the insertion of a filter element 2 provided with the sealing element 5 according to the invention into an opening 3 of a perforated plate 4 of a housing body of a filtering device. Preferably, the bevel 5d is formed over a height h2 of the sealing element 5 of 0.5 to 4 mm, more preferably 1 to 3 mm, and with a slope of preferably 10° to 45°, more preferably 15° to 40°.

Figure 6:
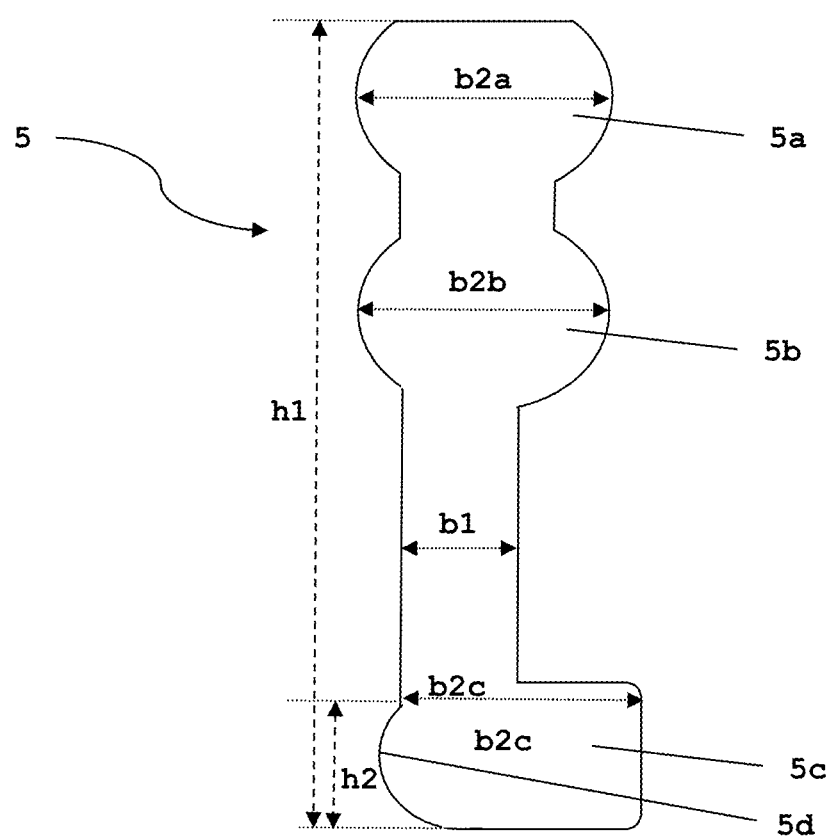
FIG. 6 shows a sectional view of a further embodiment of the sealing element according to the invention through axis A-A in FIG. 4

FIG. 6 shows a sectional view through axis A-A in FIG. 4 of a further embodiment of the sealing element according to the invention.

The sealing element 5 has a height h1 which is in the range of 10 to 40 mm, more preferably 11 to 30 mm and particularly preferably 12 to 20 mm. The sealing element 5 has a thickness b1 parallel to the ring plane, which is preferably in the range of 2 to 8 mm, more preferably 2.5 to 6 mm.

In one half (shown here at the top, but located at the bottom in the state arranged on a filter element 2), two integral O-ring-shaped parts 5a, 5b are provided. These O-ring-shaped parts 5a, 5b are configured as protuberances and, due to their outwardly extending protuberances, serve for the sealing arrangement of a filter element 2 provided with this sealing element 5 in an opening 3 of a perforated plate 4, while the inwardly extending protuberances serve for the non-slip arrangement of the sealing element 5 on a filter element 2 and for sealing between the filter element and the sealing element. The O-ring-shaped parts 5a, 5b have thicknesses b2a and b2b parallel to the ring plane, which are each larger than the thickness b1 of the sealing element 5. The thicknesses b2a and b2b may be the same or different from each other. According to the invention, the thicknesses b2a and b2b are preferably extended in cross-section relative to the thickness b1 of the sealing element 5 by a value in the range from 1.5 to 7 mm, more preferably 2 to 6 mm and particularly preferably 2.5 to 5 mm.

At one end of the sealing element 5 (shown here at the bottom, but located at the top in the state arranged on a filter element 2), the sealing element 5 has an L-shape and has an integral section 5c. The section 5c serves as a stop damper by projecting over an edge of a filter element 2 in the arranged state and protecting the same.

In the region of the section 5c, the sealing element 5 has a thickness b2c which, in cross-section, is extended into the interior of the sealing element 5 preferably by 2 to 10 mm, more preferably by 3 to 6 mm, as compared with the thickness b1 of the sealing element 5.

In the embodiment according to FIG. 5, the sealing element 5 has a protuberance 5d in this section on its outer side, i.e. the corresponding end of the sealing element on the side facing away from the inner circular cut-out. Preferably, the protuberance 5d is formed over a height h2 of the sealing element 5 of 0.5 to 4 mm, more preferably 2 to 3.5 mm, and outwardly extends in cross-section away from the sealing element by a value of 0.5 to 3 mm, preferably 1 to 2.5 mm and particularly preferably 1.2 to 2 mm.

Figure 7:
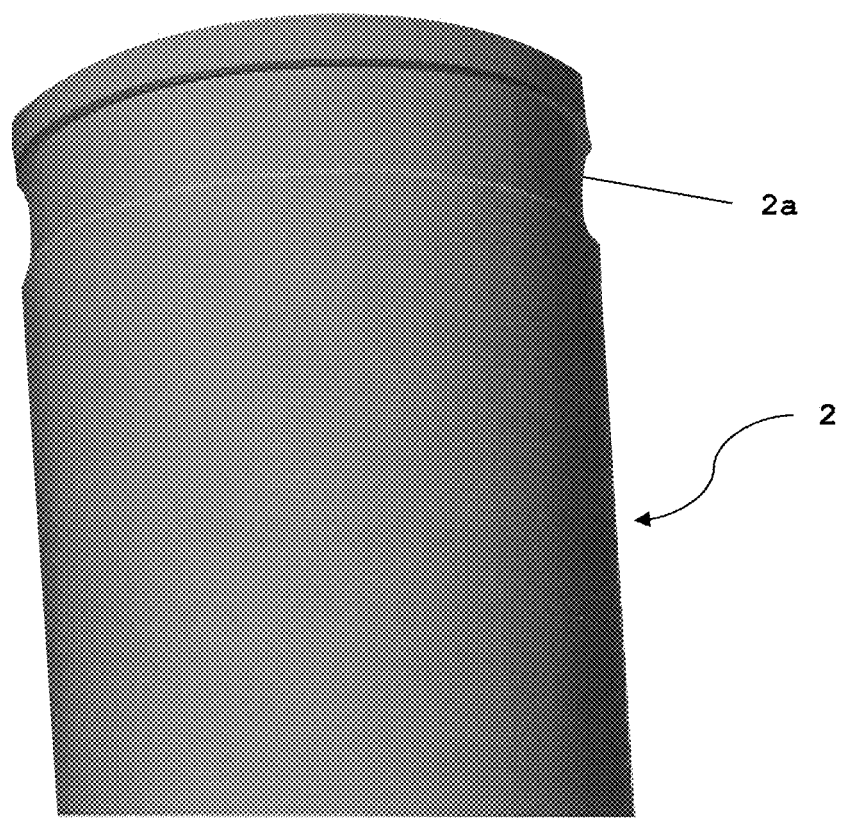
FIG. 7 shows a view of an embodiment of a preferred filter element according to the invention

In FIG. 7, a view of a preferred embodiment of a filter element 2 according to the invention is shown. The filter element 2 according to this embodiment is characterized by a ground joint 2a which can receive the protuberances 5a, 5b in the sealing arrangement section of the sealing element 5. As a result, the sealing element 5 can be arranged on the filter element 2 in a non-slip manner.

Preferably, the ground joint 2a has a height axially to the rod axis of the filter element in the range of 5 to 20 mm, more preferably 5 to 15 mm and particularly preferably 6 to 10 mm.

Further preferably, the ground joint 2a has a depth in the range of 0.1 to 7 mm, more preferably 2 to 6 mm and particularly preferably 2.5 to 5 mm. In other words, the radius of the filter element 2 at the ground joint 2a is reduced by the aforementioned value.

Figure 8:
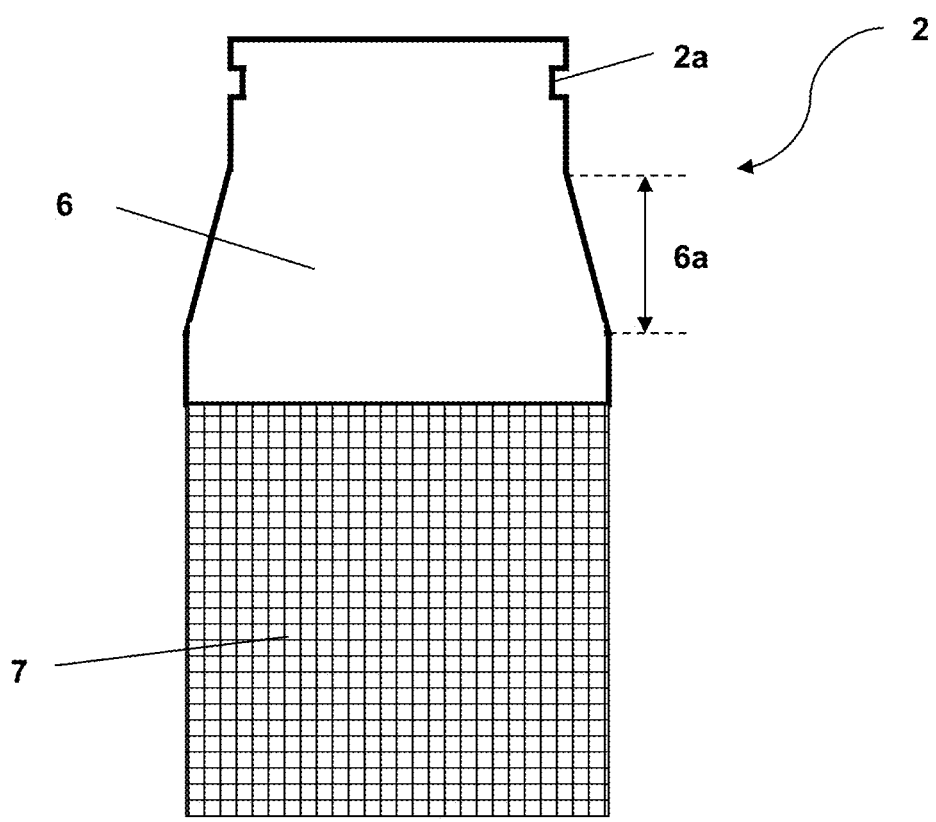
FIG. 8 shows a view of an embodiment of a preferred plastic filter element according to the invention

In FIG. 8, a view of a preferred embodiment of a plastic filter element 2 according to the invention is shown. The filter element 2 according to this embodiment is characterized by a ground joint 2a which can accommodate protuberances 5a, 5b in the sealing arrangement section of the sealing element 5. As a result, the sealing element 5 can be arranged on the filter element 2 in a non-slip manner.

The plastic filter element according to FIG. 8 has an end piece 6. The end piece is connected to a membrane tube 7 or a membrane bundle of several membrane tubes, for example by a layer of cured epoxy resin. Preferably, both ends of the membrane tube 7 or membrane bundle are each connected to an end piece 6 as described above, wherein these end pieces particularly preferably have the same dimensions.

The end piece 6 is tapered over a section 6a so that its diameter varies over its height. In FIG. 8, the end piece 6 has a larger diameter at the end connected to a membrane tube 7 or membrane bundle than at the end to be arranged in a perforated plate and provided with a ground joint 2a.

The invention claimed is:

1. A housing body for a filtration device, comprising at least one filter element with a sealing element arranged thereon,
   wherein the sealing element has a one-piece annular design and comprises a section for a sealing arrangement of the filter element in the housing body and a section for stop damping the filter element, wherein the section of the sealing element, for sealingly arranging the filter element in the housing body, comprises at least one integral O-ring shaped part, and is arranged in one half of the sealing element, wherein the section for stop damping an end edge of the filter element comprises a portion projecting into an interior of the annular sealing element, and wherein the section for stop damping the filter element is arranged at another end of the sealing element, which is different from the end with the section of the sealing element for sealing arrangement of the filter element in the housing body, and wherein the section for stop damping the filter element has a protuberance on an outer side thereof.

2. The housing body according to claim 1, wherein the filter element is rod-shaped.

3. The housing body according to claim 1, wherein the filter element is either a ceramic filter element or a plastic filter element.

4. The housing body according to claim 1, wherein the filter element has a ground joint at least at one end.

5. The housing body according to claim 1, wherein the filter element comprises a membrane tube or a membrane bundle of a plurality of membrane tubes and at least one end piece.

6. The housing body according to claim 5, wherein said end piece comprises a conical portion.

7. The housing body according to claim 1, wherein the sealing element is arranged over at least one end of the filter element.

8. The housing body according to claim 1, wherein the housing body has exactly two perforated plates with openings for receiving the filter element provided with the sealing element.

9. The housing body according to claim 1, wherein the housing body is for a cross-flow filtration device.

10. The housing body according to claim 1, wherein the housing body comprises 1 to 300 filter elements.

* * * * *